US009800598B2

(12) United States Patent
Peterson et al.

(10) Patent No.: US 9,800,598 B2
(45) Date of Patent: *Oct. 24, 2017

(54) DETECTING SHARED OR COMPROMISED CREDENTIALS THROUGH ANALYSIS OF SIMULTANEOUS ACTIONS

(71) Applicant: Dell Software, Inc., Round Rock, TX (US)

(72) Inventors: Matthew T Peterson, Lindon, UT (US); Daniel F Peterson, Pleasant Grove, UT (US); Jordan S Jones, Spanish Fork, UT (US)

(73) Assignee: Quest Software Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,958

(22) Filed: Jan. 30, 2017

(65) Prior Publication Data

US 2017/0142141 A1 May 18, 2017

Related U.S. Application Data

(63) Continuation of application No. 14/694,647, filed on Apr. 23, 2015, now Pat. No. 9,596,249.

(51) Int. Cl.
*G06F 7/04* (2006.01)
*G06F 12/14* (2006.01)
*H04L 29/06* (2006.01)

(52) U.S. Cl.
CPC ...... *H04L 63/1416* (2013.01); *H04L 63/0281* (2013.01); *H04L 63/06* (2013.01); *H04L 63/1441* (2013.01); *H04L 2463/121* (2013.01)

(58) Field of Classification Search
CPC . H04L 63/1416; H04L 63/0281; H04L 63/06; H04L 63/1441; H04L 2463/121
USPC .................................................. 726/6, 4, 22
See application file for complete search history.

(56) References Cited

U.S. PATENT DOCUMENTS

| 9,596,249 | B2 * | 3/2017 | Peterson | ............. H04L 63/1416 |
| 2012/0166626 | A1 * | 6/2012 | Rai | ..................... H04L 12/6418 |
| | | | | 709/224 |
| 2014/0344927 | A1 * | 11/2014 | Turgeman | ............. H04W 12/06 |
| | | | | 726/22 |

* cited by examiner

*Primary Examiner* — Aravind Moorthy
(74) *Attorney, Agent, or Firm* — Brian Tucker; Kirton McConkie

(57) ABSTRACT

A privileged account management system can detect when credentials used to access one or more servers have been shared or otherwise compromised. This detection can occur through analysis of simultaneous actions that are performed via multiple sessions associated with the same administrator. When two or more sessions associated with the same administrator are opened, the interactions performed over each of the sessions can be monitored to identify whether such interactions could be performed by a single administrator. If it is determined that the interactions over the multiple sessions could not reasonably be performed by a single administrator, various actions can be taken to address the possible breach to the security of the one or more servers.

19 Claims, 9 Drawing Sheets

DETECTING SHARED OR COMPROMISED CREDENTIALS THROUGH ANALYSIS OF SIMULTANEOUS ACTIONS

CROSS-REFERENCE TO RELATED APPLICATIONS

This application is a continuation of U.S. patent application Ser. No. 14/694,647 which was filed on Apr. 23, 2015.

BACKGROUND

Most organizations maintain at least one server for storing sensitive information and executing secure resources. For example, an organization may maintain a customer database that stores sensitive information about its customers on a server. Typically, access to such servers is restricted by locating the servers in a secure area and by requiring admin credentials to obtain access to the servers. In this specification, access to a server should be construed broadly as encompassing access to any data stored on the server, access to any application executing on the server (including the operating system of the server), or access to any other computing construct provided by the server.

In such cases, an organization will typically employ one or more administrators to maintain the servers. To allow these administrators to perform their assigned functions, they may oftentimes share the admin credentials for accessing the secure servers so that any one of the administrators can use the admin credentials at any particular time. FIG. 1 depicts this typical scenario. As shown, an administrator 150 uses a client device 102 to access a server 101 using admin credentials known to administrator 150 and possibly to other administrators. Access in this manner is typically accomplished by using a network protocol (e.g., SSH, RDP, Telnet, etc.) to remotely connect to server 101.

Various problems exist with this approach including, for example, that an administrator may retain knowledge of the admin credentials even after his employment with the organization, and that there are few options for identifying which administrator has used the admin credentials to perform a particular task on server 101. To address these problems, an organization may oftentimes employ a privileged account (or access) management ("PAM") system. Generally, a PAM system acts as an intermediary between server 101 and client device 102 to manage and/or monitor access to server 101.

PAM systems can typically perform two basic functions. First, a PAM system can control and monitor who obtains access to the admin credentials. This is typically accomplished by frequently changing the admin credentials (e.g., after each use of the admin credentials). FIG. 2A depicts an example of a PAM system providing this function. Second, a PAM system can monitor the interactions of the administrator with the server while using a remote session to connect to the server. FIGS. 2B and 2C depict different examples of a PAM system providing this function.

In FIG. 2A, a PAM system 103 acts as an intermediary between client device 102 and server 101 to control and monitor who obtains access to the admin credentials for creating a session with server 101. In this scenario, it will be assumed that PAM system 103 updates the admin credentials (e.g., changes the password) after each time an administrator is given access to the admin credentials (e.g., after each time an administrator checks in the admin credentials). Accordingly, prior to accessing server 101, an administrator is required to request the current admin credentials. As shown, in step 1, administrator 150 uses client device 102 to send a request to PAM system 103 for the current admin credentials for accessing server 101. Typically, this request will first require authentication (e.g., the input of credentials specific to administrator 150) and specify a reason for the request (e.g., to reboot server 101, backup server 101, install or update a server resource, etc.). In such cases, a security officer 151 will be notified of the request. In step 2, the security officer approves the request causing the current admin credentials to be returned to (or checked out to) client device 102 in step 3. Then, in step 4, administrator 150 can use the checked out admin credentials to create a session (e.g., an SSH or RDP session) with server 101 to accomplish the desired tasks. Finally, in step 5, after completing the desired tasks, administrator 150 checks in the admin credentials. Typically, PAM system 103 would then change the admin credentials to prevent administrator 150 from being able to again access server 101 without first repeating steps 1-3.

FIGS. 2B and 2C represent different ways in which PAM system 103 may be configured to allow a session to be monitored. In some implementations, this monitoring can be performed in conjunction with the functions described with reference to FIG. 2A. FIG. 2B represents a case where PAM system 103 employs a proxy between client device 102 and server 101. In contrast, FIG. 2C represents a case where PAM system 103 employs an agent on server system 101 to manage a session with client device 102. Although not specifically described, PAM system 103 could also employ a hosted session configuration which, for purposes of this background, would be illustrated in a similar manner as FIG. 2B but with the proxy being replaced by a hosted session component. It is noted that the specific configuration employed by PAM system 103 is not essential to the invention, and the invention applies equally to any configuration of PAM 103.

In the proxy configuration depicted in FIG. 2B, administrator 150, in step 1, uses client device 102 to send a request to PAM system 103 for a privileged session with server 101. Typically, this request would require authentication, include a reason for the access, and require approval by security officer 151 in step 2. Assuming the request is approved, in step 3, PAM system 103 implements a proxy 201 for maintaining two remote sessions. Step 3a represents the creation of a session (e.g., an SSH or RDP session) between proxy 201 and server 101 in which the admin credentials are used by proxy 201 to access server 101. Step 3b represents the creation of a corresponding session (e.g., an SSH or RDP session) between client device 102 and proxy 201. Proxy 201 acts as an intermediary for routing session traffic between the corresponding sessions. Because all communications between client device 102 and server 101 pass through proxy 201, PAM system 103 can monitor the session as shown in step 4. In this depicted implementation, the admin credentials are never provided to administrator 150.

It is noted that a variation on the implementation shown in FIG. 2B exists in which the admin credentials are provided to administrator 150 (e.g., as described with reference to FIG. 2A). In such a variation, rather than having PAM system 103 automatically initiate the corresponding sessions via proxy 201, administrator 150 may first initiate a session with proxy 201 using the admin credentials, and then proxy 201 would initiate a corresponding session with server 101. Similarly, when the administrator is provided with the admin credentials, a PAM system may be configured to implement a transparent proxy or other type of proxy. However, as mentioned above, the present invention can be implemented in any PAM system configuration including many different types of proxy configurations.

In the agent configuration depicted in FIG. 2C, a similar set of steps are followed. The primary difference between the proxy and host configurations is that in the host configuration, the host has direct access to the server resources because it executes on server 101, and therefore a single session is required between client device 102 and agent 202. In other words, agent 202 can access server resources in a similar manner as a user could if directly interacting with server 101. In the agent configuration, for purposes of this specification, the agent that executes on the server is considered as being part of the PAM system. As with the proxy implementation, the session between client device 102 and agent 202 can be initiated automatically by PAM system 103 (e.g., in implementations where the admin credentials are not provided to administrator 150), or the session can be initiated in response to a request from client device 102 (e.g., in implementations where the admin credentials are provided to administrator 150).

In each of the configurations represented by FIGS. 2B and 2C, PAM system 103 can be configured to monitor and store any communications that are transmitted over a session between client device 102 and server 101. This monitoring can typically include capturing keystrokes and mouse input among other things.

BRIEF SUMMARY

The present invention extends to methods, systems, and computer program products for detecting when credentials used to access one or more servers have been shared or otherwise compromised. This detection can occur through analysis of simultaneous actions that are performed via multiple sessions associated with the same administrator. When two or more sessions associated with the same administrator are opened, the present invention can monitor the interactions performed over each of the sessions to identify whether such interactions could be performed by a single administrator. If it is determined that the interactions over the multiple sessions could not reasonably be performed by a single administrator, various actions can be taken to address the possible breach to the security of the one or more servers.

In one embodiment, the present invention is implemented as a method, implemented by a privileged account management system, for detecting when multiple individuals are likely interacting with multiple privileged sessions that are associated with a single administrator. Multiple privileged sessions that are each associated with a single administrator can be monitored. Each of the multiple privileged sessions is concurrently established using the same admin credentials. The multiple privileged sessions include a first privileged session that is established with a first client device and a second privileged session that is established with a second client device. While monitoring the multiple privileged sessions, it is detected that first data is transmitted over the first privileged session at a first time and that second data is transmitted over the second privileged session at a second time. The first time is compared to the second time to determine that the second time is within a threshold of the first time. The first data and the second data are analyzed to determine that the first data represents first user input to the first client device and that the second data represents second user input to the second client device. Based on the comparison and the analysis, it is determined that it is unlikely that the single administrator provided the first user input and the second user input. In response to determining that it is unlikely that the single administrator provided the first user input and the second user input, an action is caused to be performed to mitigate risk to one or more servers accessible via one or both of the first and second privileged sessions.

In another embodiment, the present invention is implemented as a privileged account management system that performs a method for detecting when multiple individuals are likely interacting with multiple privileged sessions that are associated with a single administrator. A first privileged session is established between a first client device and a first server. The first privileged session is associated with an administrator. While the first privileged session is established, a second privileged session is established between a second client device and the first server or a second server. The second privileged session is associated with the administrator. Data transmitted over the first and second privileged sessions is monitored. First data that is transmitted over the first privileged session and second data that is transmitted over the second privileged session are received. The first data and the second data are analyzed to determine that the first data represents first user input to the first client device and the second data represents second user input to the second client device. It is determined that the first user input and the second user input occurred simultaneously thereby indicating that the administrator likely did not provide both the first user input and the second user input. An action is then caused to be performed to mitigate risk to the first or second servers.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
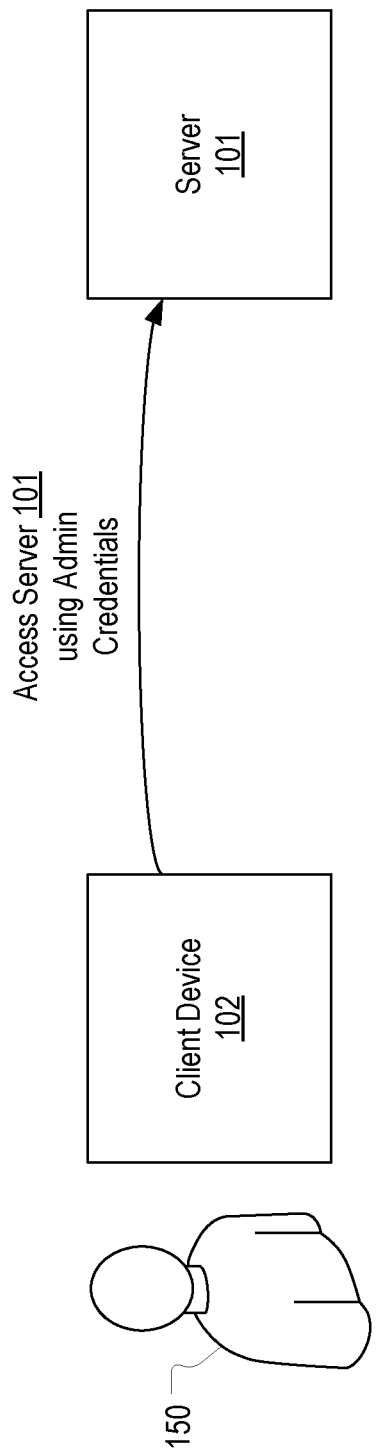
FIG. 1 illustrates a prior art example of how a client device can be used to remotely access a server using admin credentials without involvement of a PAM system.
Figure 2A:
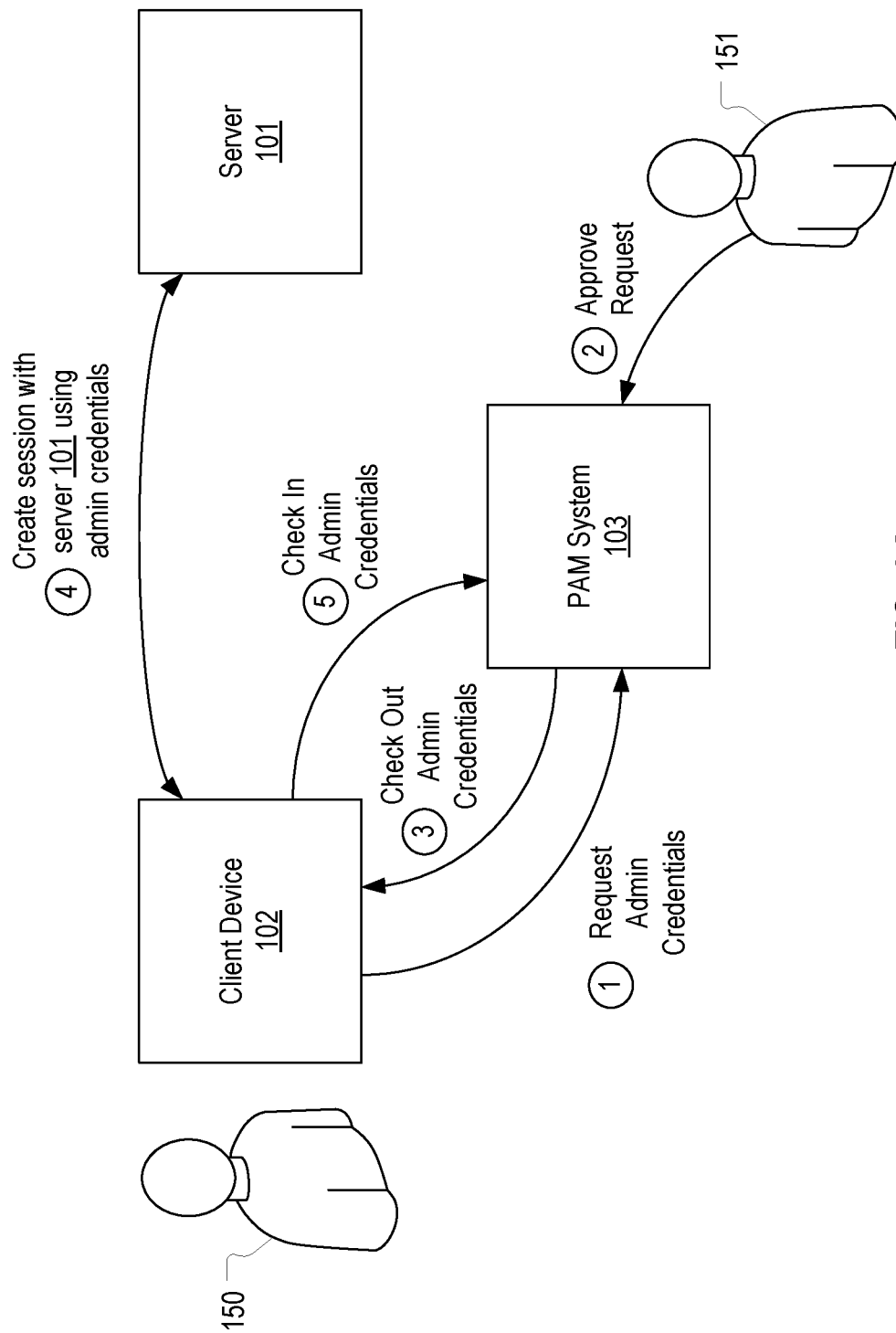
FIG. 2A illustrates a prior art example of how a PAM system can be used to control and monitor who obtains access to admin credentials used to access a server.
Figure 2B:
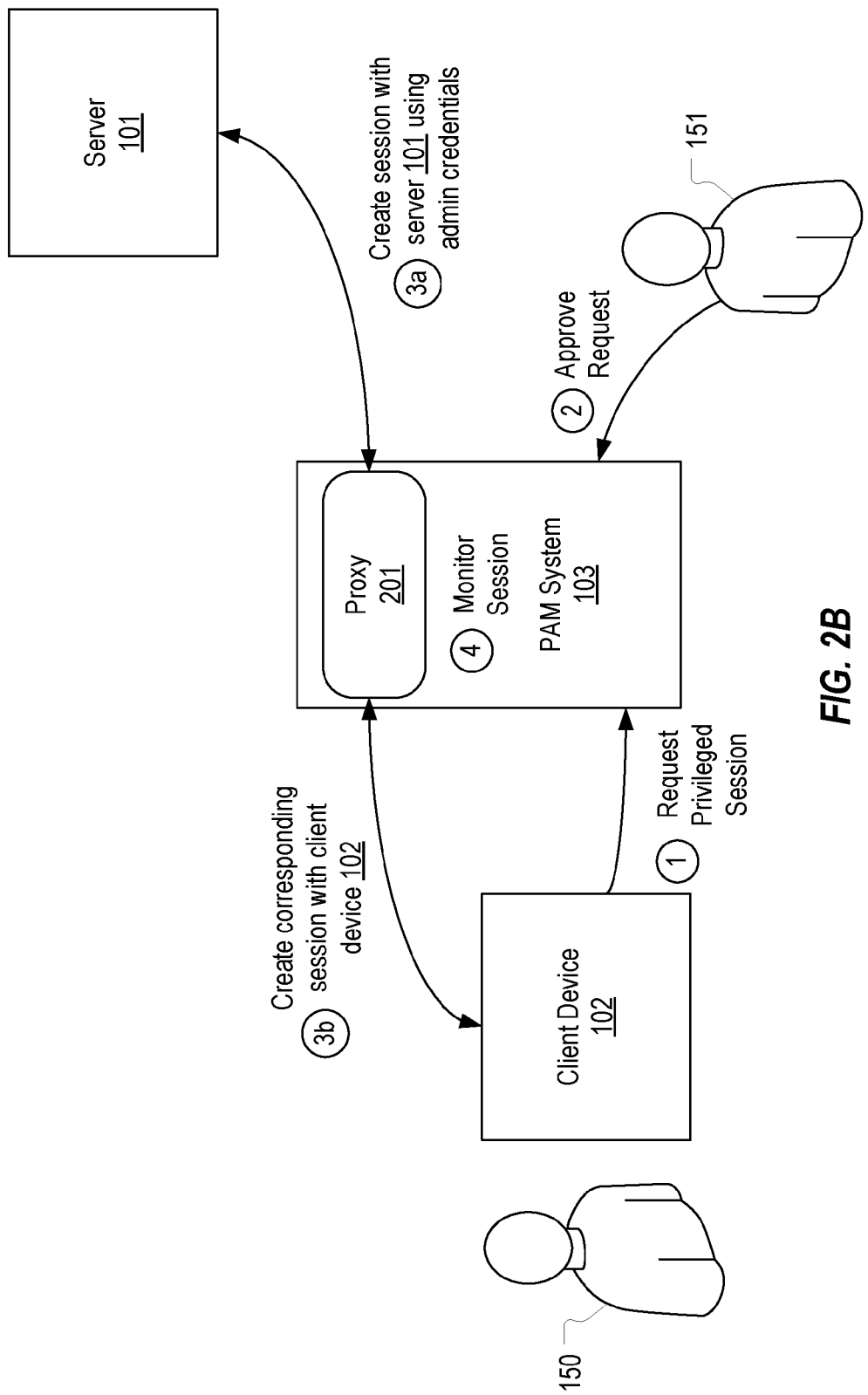
FIG. 2B illustrates a prior art example of how a PAM system can employ a proxy to control and monitor a client device's access to a server.
Figure 2C:
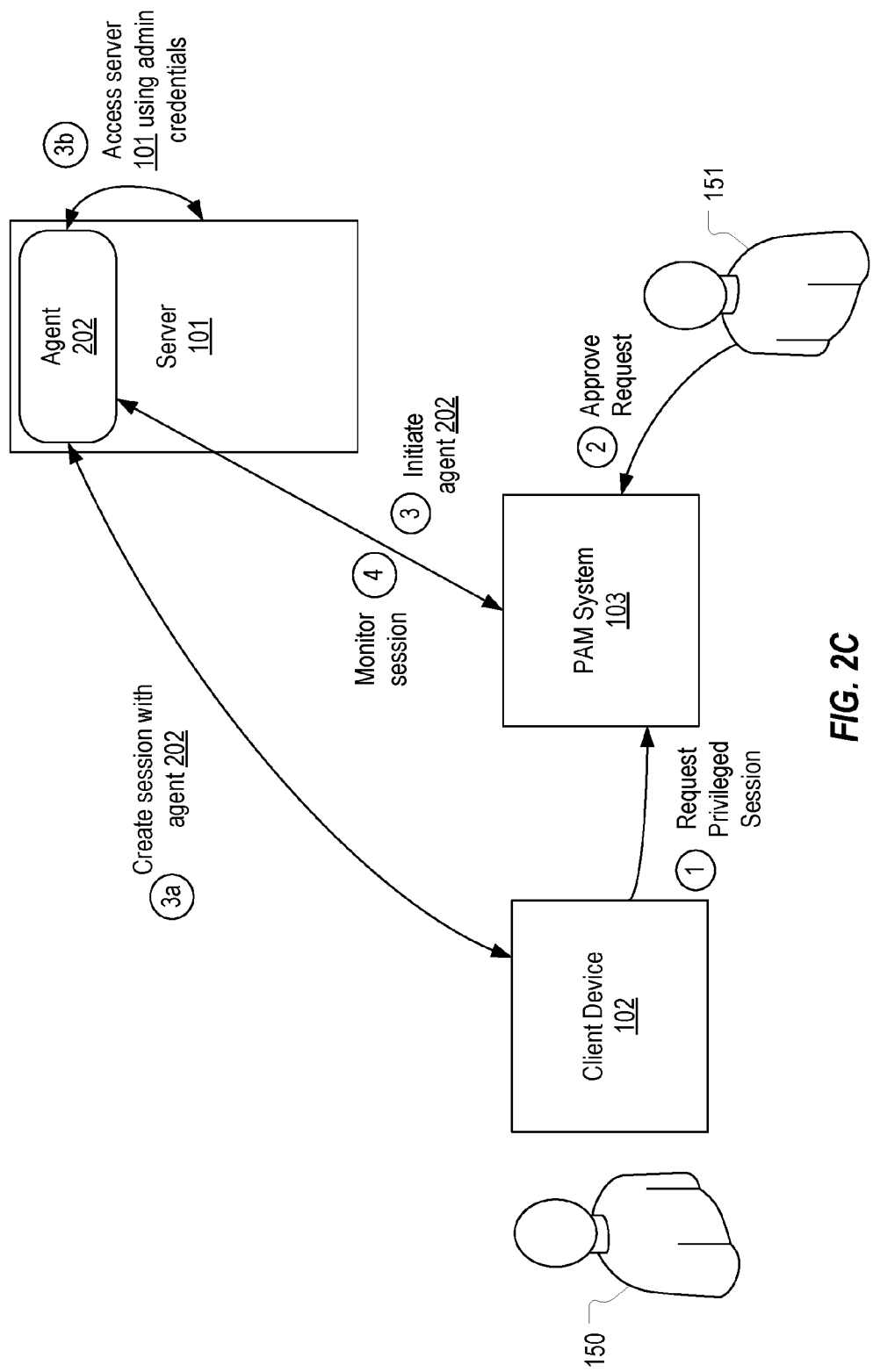
FIG. 2C illustrates a prior art example of how a PAM system can employ an agent hosted on a server to control and monitor a client device's access to the server.

In this specification, a privileged session should be construed as referring to any session established between a client device and a server to allow the client device to remotely connect to the server for purposes of accessing the server's secure resources. A privileged session includes sessions initiated by the client device as well as those initiated by a component of the PAM system (e.g., a proxy or agent component). Also, a privileged session can employ any of the many different suitable protocols for remotely connecting to a server including, for example, SSH, RDP, Telnet, ICA, VNC, X, etc. A privileged session should be construed as encompassing, but not limited to, any of the sessions depicted in FIGS. 2B and 2C including a session that is not directly between the client device and the server (e.g., a session between a proxy and the server). In a proxy or hosted session configuration, a privileged session can be construed as encompassing both the remote session between the client device and the proxy or hosted session component and the remote session between the proxy or hosted session component and the server.

Also, in this specification, events or occurrences that are described as being simultaneous or at the same time should be construed as occurring within a defined threshold from one another. In some embodiments, in addition to employing a defined threshold, a PAM system can also employ an algorithm that takes into account the types of events or occurrences (e.g., the types of user input), whether the events are interleaving, and other factors to determine whether multiple events or occurrences were simultaneous.

As mentioned in the background, when an administrator desires to access a server that is governed by a PAM system, the administrator is typically required to first authenticate with the PAM system. This authentication is implemented using the administrator's own user credentials (e.g., an email address/password, username/password, certificate/password, OpenID, private key/password, smartcard/password, etc. specific to the particular administrator). Such credentials will be referred to hereafter as user credentials and differ from the admin credentials required to access a server. After an administrator is properly authenticated to the PAM system, he may then receive the admin credentials for initiating a privileged session, or, if the PAM system implementation does not allow admin credentials to be given to the administrator, may automatically be given a privileged session.

In any case, the PAM system can maintain a mapping between a privileged session and the administrator associated with the privileged session. In implementations where the admin credentials are checked out to the administrator, because the PAM system knows which administrator has checked out the admin credentials, it can also know that any session created using the admin credentials while the admin credentials are checked out is associated with the administrator. Similarly, in implementations where privileged sessions are automatically created without providing the admin credentials to the administrator, the PAM system knows that the created privileged session is associated with the administrator that requested it.

It is noted that two remote sessions can be established using different admin credentials while still being associated with the same administrator. For example, an administrator may make two requests to a PAM system to obtain the admin credentials for two different servers. The administrator may then establish a remote session with each of the two servers. For purposes of this specification, each of these remote sessions should be construed as being associated with the same administrator even though different admin credentials were employed to create the remote sessions.

The present invention extends to embodiments where a PAM system is configured to analyze multiple concurrent privileged sessions that are associated with the same administrator to determine whether activity occurring on the multiple concurrent privileged sessions indicates that the admin credentials have been shared or otherwise compromised. A common policy in a PAM system is that admin credentials and/or privileged sessions should not be shared or otherwise accessed by another individual. Therefore, if it is determined from this analysis that the admin credentials have likely been shared or compromised, the PAM system can take corrective action to minimize any harm that has been caused or may be caused to a server's secure resources.

The present invention is based on the premise that there are activities that a single human being should not be capable of performing over multiple concurrent privileged sessions. Although it is common for an administrator to open more than one privileged session at the same time and to interact with server resources over these multiple sessions, a PAM system in accordance with embodiments of the present invention can be configured to identify scenarios where the input data that is concurrently transmitted over multiple sessions indicates that more than one human being is providing the input. For example, if keyboard or mouse input is being transmitted simultaneously over two privileged sessions associated with the same administrator, it can be determined that two individuals are likely providing such input since a single human should not be capable of typing simultaneously or using a mouse simultaneously within two privileged sessions.

Figure 3:
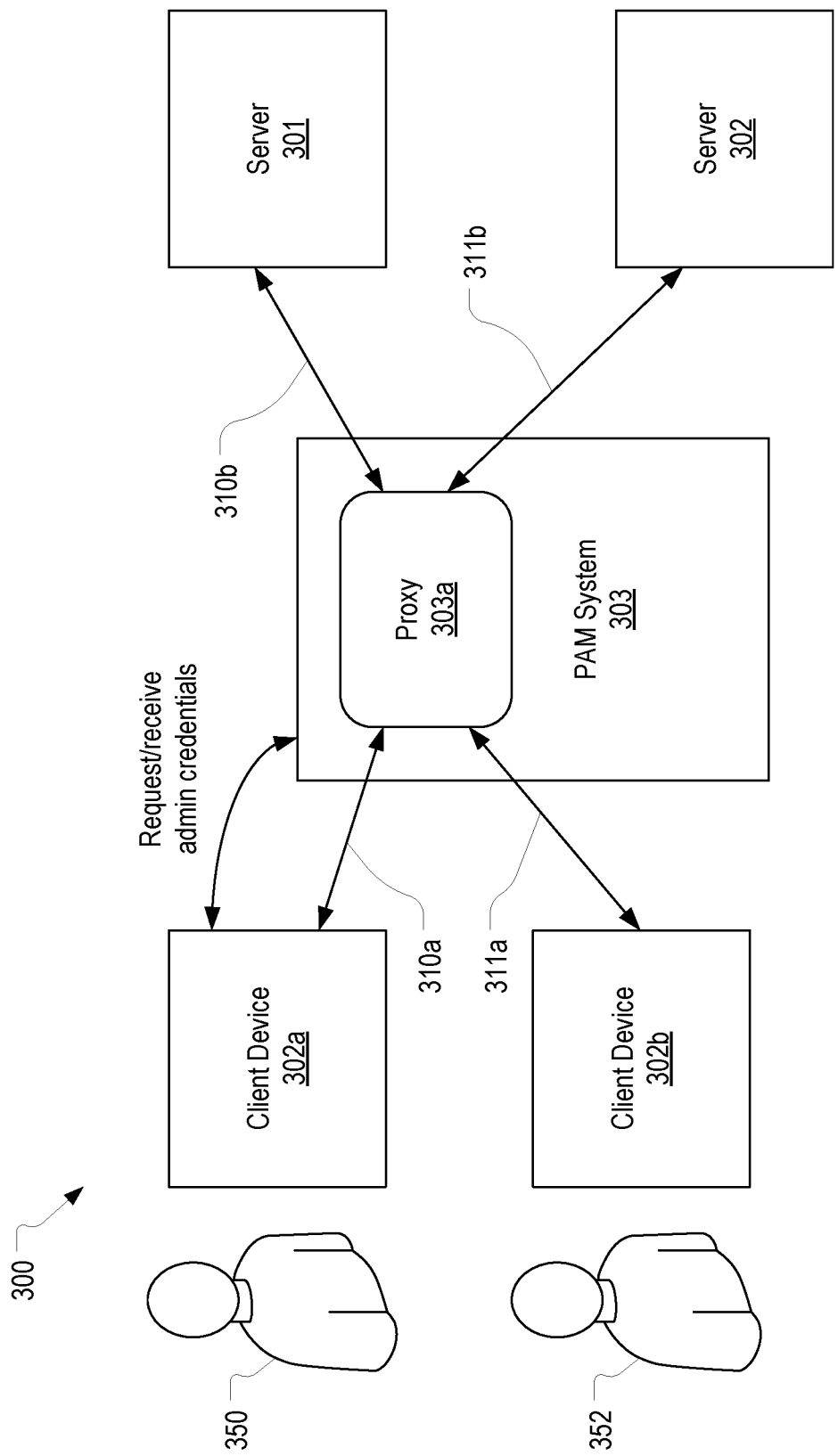
FIG. 3 illustrates an example of how a PAM system can monitor input data transmitted over two privileged sessions that are associated with the same administrator to determine if multiple individuals are providing the input.

FIG. 3, which depicts a PAM system architecture 300 that employs a proxy, illustrates an example of how a PAM system can analyze data transmitted over two sessions associated with the same administrator to determine whether multiple individuals are providing input to the sessions. As shown, an administrator 350 submits a request to PAM system 303 to receive the admin credentials for accessing server 301. In this example, it will be assumed that the admin credentials for accessing both servers 301 and 302 are the same. The process of receiving the admin credentials can be substantially the same as described in the background. In this example, it will be assumed that the admin credentials are provided, or checked out, to administrator 350.

Administrator 350 can then use the admin credentials to remotely connect to server 301. Because architecture 300 employs a proxy, this is accomplished by establishing a first session 310a between client device 302a and proxy 303a and a corresponding first session 310b between proxy 303a and server 301 (collectively identified as first privileged session 310). Because PAM system 303 knows that the admin credentials are checked out to administrator 350, it knows that first privileged session 310, which is established using the checked out admin credentials, is associated with administrator 350. PAM system 303 can monitor data transmitted over first privileged session 310 in any manner known in the art.

Then, while first privileged session 310 is established, the admin credentials are again used to remotely connect to server 302 from a second device, client device 302b. This is accomplished by establishing a second session 311a between client device 302b and proxy 303a and a corresponding second session 311b between proxy 303a and server 301 (collectively identified as second privileged session 311). PAM system 303 also knows that second privileged session 311 is associated with administrator 350 because the checked out admin credentials were used to establish second privileged session 311.

Prior to proceeding to a description of how PAM system 303 analyzes input over privileged sessions 310, 311, it is noted that the configuration depicted in FIG. 3 is exemplary only. The following description would apply equally in different configurations. For example, second privileged session 311 could be established with server 301 rather than server 302. Also, different admin credentials could be required to establish a privileged session with server 302 in which case administrator would typically make a separate request to obtain such admin credentials. Regardless of the configuration, PAM system 303 can analyze input data over privileged sessions 310, 311 because they are both associated with the same administrator.

At this point, because two concurrent privileged sessions are associated with administrator 350, PAM system 303 can analyze data transmitted over both privileged sessions 310, 311 to determine whether more than one individual is interacting with the privileged sessions. It is noted that the existence of two concurrent privileged sessions from multiple client devices 302a, 302b alone does not indicate that anyone other than administrator 350 is interacting with privileged sessions 310, 311. For example, administrator 350 may establish both of privileged sessions 310, 311 from client device 302a. Similarly, client device 302a may be administrator 350's desktop computer while client device 302b may be a laptop that administrator 350 is also using at his desk. For this reason, PAM system 303 can analyze the data within each privileged session 310, 311.

In FIG. 3, while privileged sessions 310, 311 are open, a separate individual 352 provides input to privileged session 311 while administrator 350 is also providing input to privileged session 310. Individual 352 may have obtained access to privileged session 311 in many different ways such as by receiving or stealing the admin credentials from administrator 350 and creating privileged session 311, receiving or stealing administrator 350's user credentials and using them to obtain the admin credentials for creating privileged session 311, accessing privileged session 311 after administrator 350 had created it (e.g., if administrator 350 left the session open on client device 302b and individual 352 obtained access to the device, or administrator 350 turned the session over to individual 352), etc. The particular manner in which individual 352 obtained access to privileged session 311 is not essential to the invention.

While administrator 350 and individual 352 are each providing input to privileged sessions 310, 311 respectively, PAM system 303 can be configured to inspect the data corresponding to such input as it is transmitted over sessions 310, 311. Assuming that both administrator 350 and individual 352 are providing keyboard input (or any other type of human input) at the same time, PAM system 303 can detect the occurrence of keyboard input data in privileged sessions 310, 311 at the same time. PAM system 303, knowing that privileged sessions 310 and 311 are both associated with administrator 350, can determine that it is likely not possible that administrator 350 is providing keyboard input simultaneously on client devices 350a, 350b and can therefore determine that multiple individuals are providing input. In response, PAM system 303 can take action to minimize any potential harm caused by the shared or otherwise compromised admin credentials.

Figure 3A:
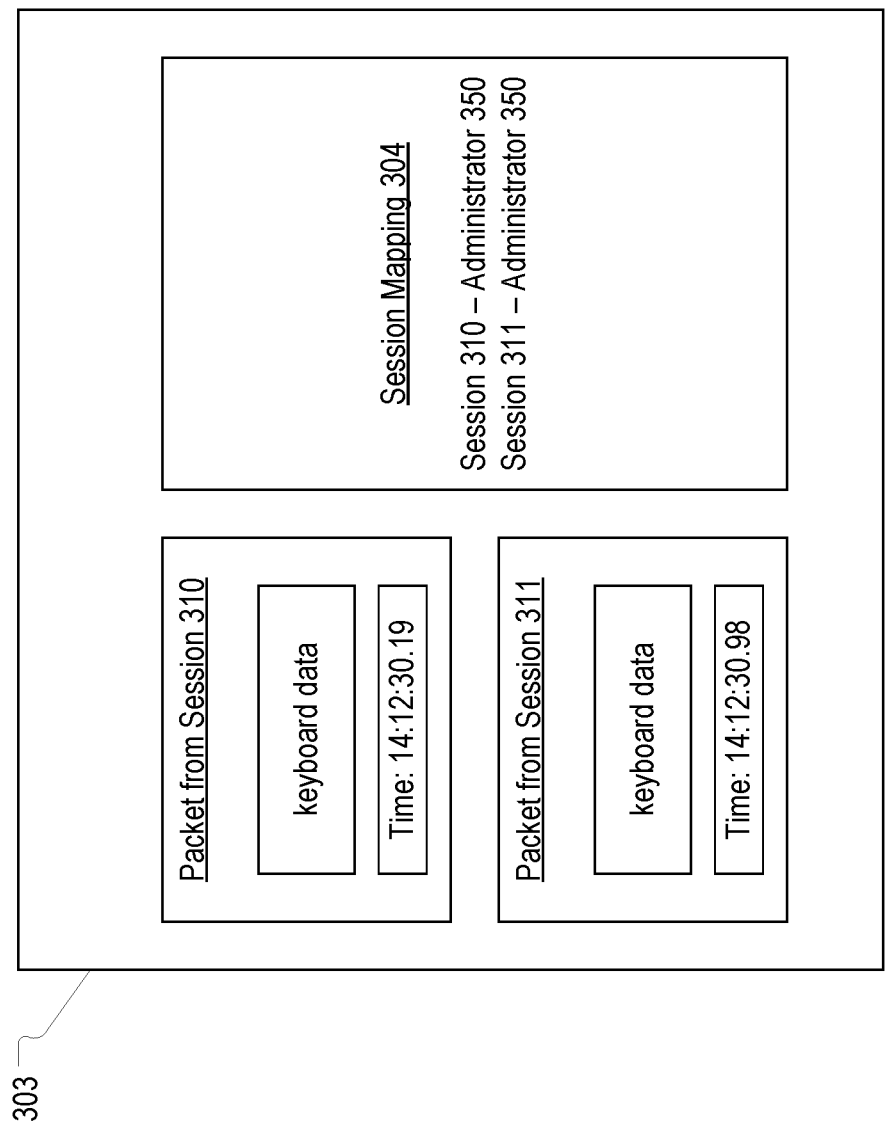
FIG. 3A illustrates an example of how a PAM system can inspect the contents of packets that are simultaneously received over two privileged sessions.

FIG. 3A illustrates a generalized example of how PAM system 303 can analyze data transmitted over multiple privileged sessions associated with the same administrator. As shown, PAM system 303 can maintain a session mapping 304 or other data structure which identifies which administrator is associated with each privileged session. In this example, session mapping 304 indicates that administrator 350 is associated with privileged session 310 and privileged session 311. Then, when packets are transmitted over each of privileged sessions 310, 311, PAM system 303 can monitor the packets.

This monitoring can include associating a timestamp to each packet to identify when the packet was received by PAM system 303. Such timestamps can be used to determine whether the content of packets received over multiple privileged sessions represents input to the client devices that occurred at the same time. With each suitable protocol that can be employed to establish privileged sessions, packets containing data representing input are transmitted after such input is received at the client device. Therefore, the time at which a packet is received by PAM system 303 can accurately represent the actual time of the input for comparison purposes.

Multiple packets can be considered as containing data representing input that occurred at the same time if the packets have timestamps that are within a defined threshold from one another. For example, if two packets are received within one second of one another, PAM system 303 can consider the packets as containing data representing input that occurred at the same time. This threshold can account for delays that may occur during the generation and transmission of a particular packet including the latency of the session protocol used to transmit the packet. In some embodiments, by monitoring the latency of the session protocol, a fairly exact timing of the input can be identified.

For example, in FIG. 3A, two packets are shown as having been received by PAM system 303. One packet is from privileged session 310 and includes a timestamp of 14:12:30.19 while the other packet is from privileged session 311 and includes a timestamp of 14:12:30.98. Because privileged sessions 310, 311 are both associated with administrator 350 (e.g., as defined in session mapping 304) and because each packet was received at substantially the same time (e.g., within one second of one another), PAM system 303 can examine the payload of each packet to determine whether they include data representing input that a single individual should not have been able to provide. As shown in FIG. 3A, both packets include keyboard data. PAM system 303 can therefore determine that it is not likely that administrator 350 provided keyboard input into both client devices 302a, 302b at the same time, and take appropriate action.

PAM system 303 could make a similar determination if each of the packets included mouse input data (because it is not likely that a single human will be providing mouse input into two separate privileged sessions at the same time) or if one packet included keyboard data while the other included mouse data (because it is not likely that a single human will use a keyboard and a mouse at the same time to provide input into separate privileged sessions). Also, the present invention should not be limited to cases involving keyboard and mouse input, but should extend to cases involving any type of human input from any type of human input device (e.g., a biometric scanner, motion sensor device, accelerometer device, audio and/or video input device, etc.) that can be transmitted over a privileged session.

In the above example, PAM system 303 determines that more than one individual is likely providing the input over privileged sessions 310, 311 based on the fact that the simultaneously received packets each contain input data. However, in some embodiments, PAM system 303 may perform a further evaluation of the input data within the simultaneously received packets to determine if it is possible that a single individual provided the corresponding input. For example, in some cases, one packet may include keyboard data representing some input while the other packet may include mouse data representing a single click or a small movement of the cursor. In such cases, PAM system 303 may not immediately determine that more than one individual is providing the input since it is possible that a single individual provided keyboard input over one session while simultaneously providing the simple mouse input. To address such uncertainty, PAM system 303 can be configured to compare the contents of a series of packets received over each privileged session. For example, if PAM system 303 received two consecutive packets over privileged session 310 and two consecutive packets over privileged session 311 at substantially the same times, and each of the packets included input data, PAM system 303 could determine that more than one individual was likely providing the input. In contrast, if a second packet was not received over privileged session 311, the fact that a single packet containing input data was simultaneously received over privileged sessions 310, 311 could be discounted.

Figure 4A:
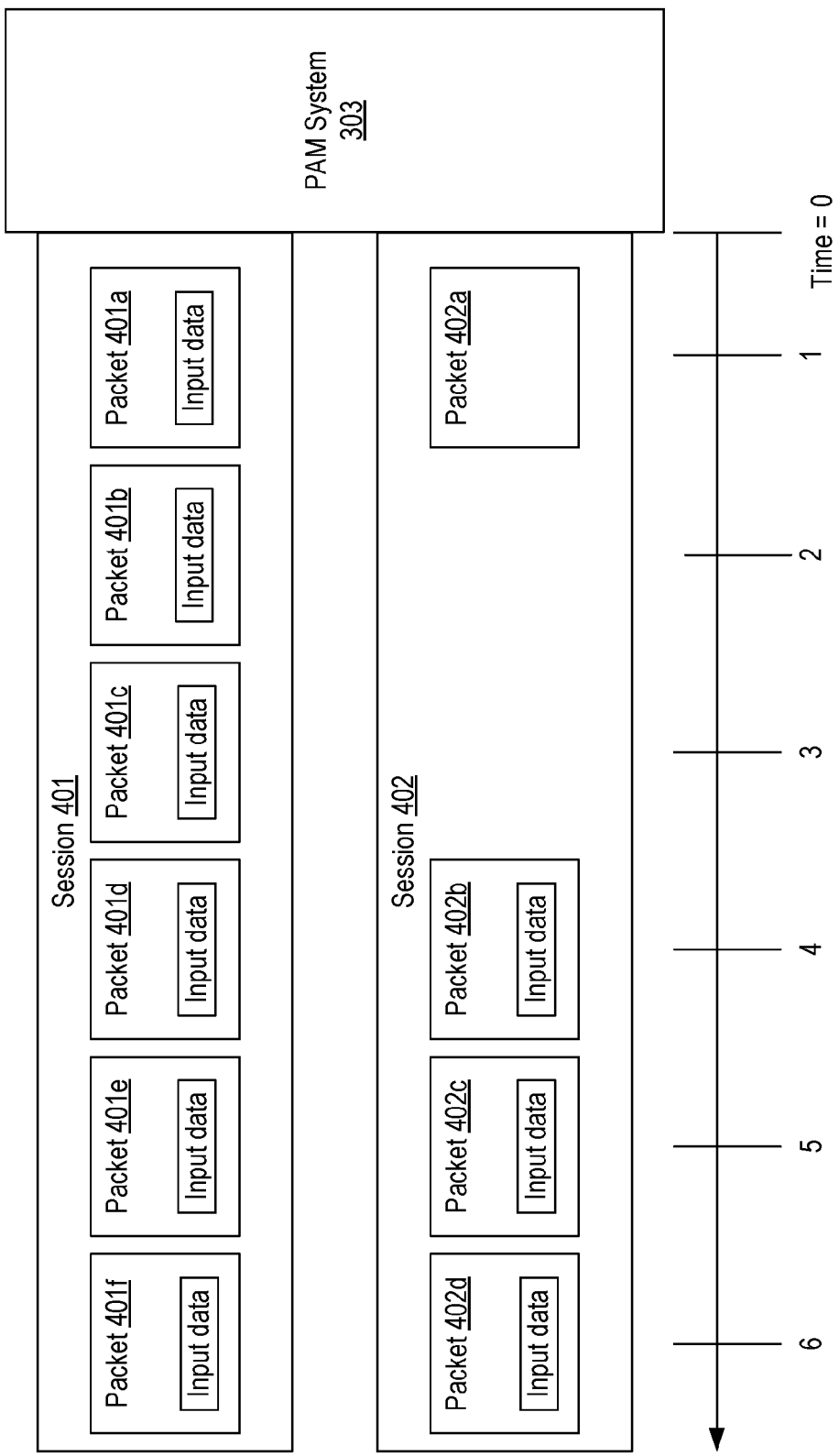
FIGS. 4A and 4B each illustrate timeline-based examples of packets that are transmitted over two privileged sessions.
Figure 4B:
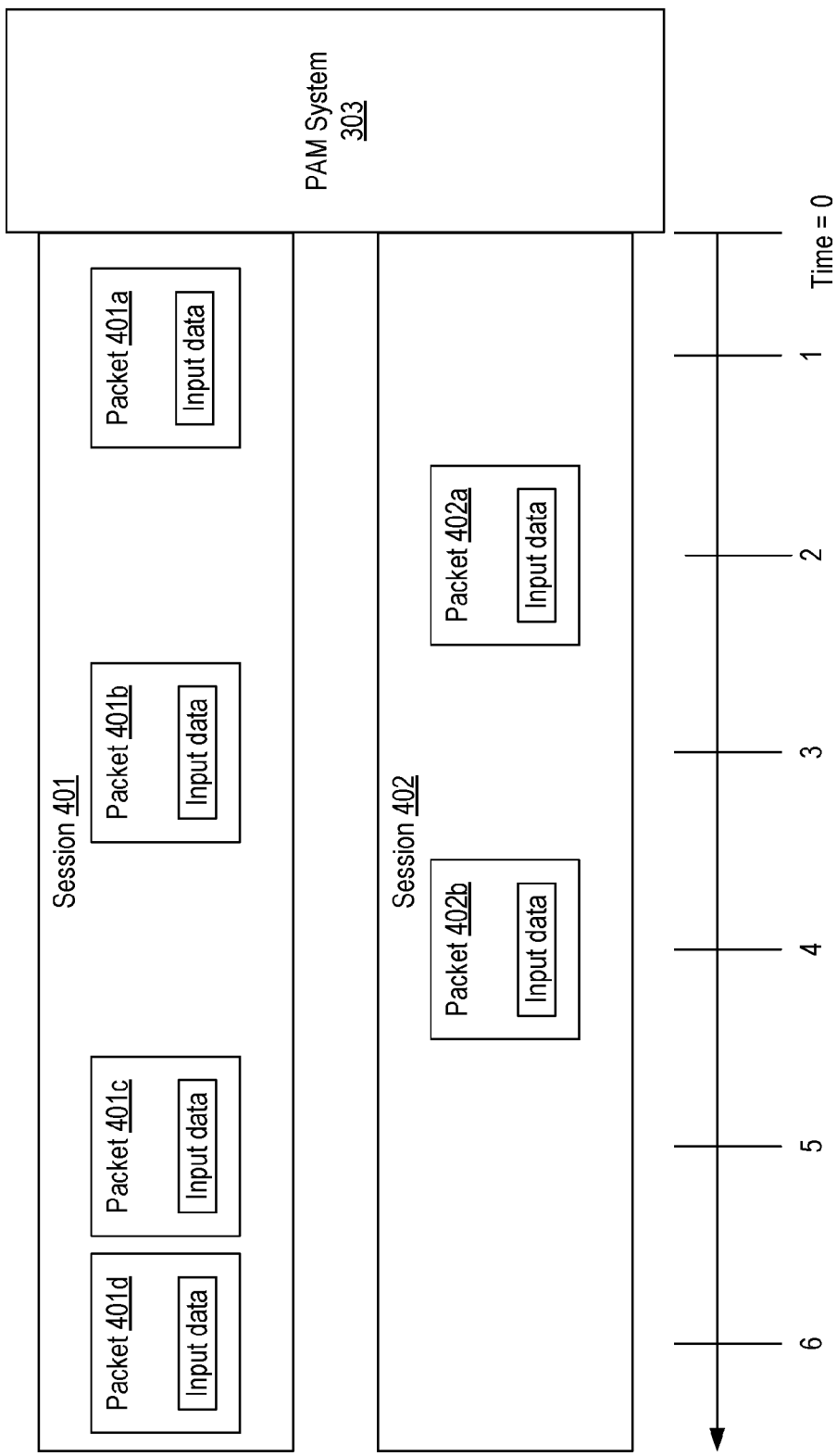

FIGS. 4A and 4B each provides a timeline-based example to better illustrate how PAM system 303 can identify packets that contain data representing input that was simultaneously provided to a client device. In each of FIGS. 4A and 4B, two privileged sessions 401, 402 are shown as being established with PAM system 303. Although not shown, each session is established with a different client device. It is assumed that each of privileged sessions 401, 402 is associated with the same administrator. The timeline depicts that packets to the right are received by PAM system 303 prior to packets to the left (i.e., the packets flow from the client device to PAM system 303).

In FIG. 4A, a series of packets 401a-401f are transmitted over privileged session 401 with each packet being received at times 1, 2, 3, 4, 5, and 6 respectively. Likewise, a series of packets 402a-402d are transmitted over privileged session 402 with each packet being received at times 1, 4, 5, and 6 respectively. As described above, PAM system 303 can monitor each of privileged sessions 401, 402 to determine whether more than a single individual is providing input over the sessions. As shown, PAM system 303 receives packets 401a and 402a at the same time, time 1. Although packet 401a includes input data, packet 402a does not (e.g., packet 402a may comprise overhead data for maintaining session 402). Therefore, even though packets 401a and 402a are received at the same time, PAM system 303 can determine that their simultaneous receipt does not suggest that more than one user is inputting data to privileged sessions 401, 402. The same result may occur if packet 402a included input data, but the input data was minimal (e.g., a mouse movement that may have occurred due to the administrator bumping a mouse on one client device while typing on the other client device) or was of the type that could be provided at the same time by a single individual (e.g., a single mouse click on one client device and typing on the other client device).

FIG. 4A also shows that packets 401b, 401c are received over privileged session 401 at times 2 and 3 respectively while no packets are received over session 402 at these times. Accordingly, at times 2 and 3, PAM system 303 will not determine that multiple users are providing input. However, at time 4, PAM system 303 receives packet 401d and packet 402b each of which includes input data. At this moment, PAM system 303 may determine that the associated administrator is not likely providing the input over both privileged sessions and can take appropriate action. Since the determination at this point is based on the receipt of packets at a single time, the action may be minimal such as, for example, flagging each privileged session for subsequent review by a security officer. Also, as described above, if the occurrence of the simultaneous input at this single time is not conclusive evidence that more than one user provided the input, PAM system 303 may delay the determination until further occurrences of simultaneous input.

At times 5 and 6, PAM system 303 can again identify that input is being provided simultaneously to each privileged session. With each additional occurrence of simultaneous input, the determination that more than one user is providing the input can be further strengthened. Accordingly, PAM system 303 may take additional action with each occurrence or after a threshold number of occurrences. For example, at time 6, upon identifying three consecutive occurrences of simultaneous input, PAM system 303 may record each of sessions 401, 402 or even close the sessions. Alternatively, PAM system 303 may immediately commence taking screen captures of the client devices to allow a security office to review the sessions from the users' perspective. PAM system 303 may also activate a camera in the client devices to capture which user is providing the input.

FIG. 4B illustrates an example where, although packets are repeatedly received over each of privileged sessions 401, 402, PAM system 303 can determine that the single administrator is likely providing the input over both sessions. In particular, at no moment are packets from each session received simultaneously. FIG. 4B can therefore represent an example where the administrator may be switching back and forth between the two privileged sessions.

In some embodiments, a PAM system can employ knowledge of the physical locations and configuration settings of client devices used to establish privileged sessions to determine whether more than one individual is providing input over multiple privileged sessions associated with the same administrator. For example, if the PAM system knows that a first privileged session has been established using a client device at a first location and a second privileged session has been established using a client device at a second location, any occurrence of simultaneous input, regardless of the type of input, could indicate that multiple individuals are providing the input since the administrator cannot be at two locations at the same time, especially when those client devices are not configured for remote access. In such cases, the threshold used to determine whether input is received at the same time may be increased to account for a known distance between the locations of the client devices.

In some embodiments, a PAM system may also be configured to monitor direct access to a server using admin credentials (e.g., when an administrator visits the server room to directly login to the server). In such cases, the direct access to the server can be treated as a privileged session for purposes of identifying whether more than one user is providing input simultaneously over more than one privileged session associated with the same administrator. For example, if the administrator opened a privileged session at his desk and then visited the server room to directly login to the server while another individual accessed the privileged session at the administrator's desk, the PAM system could detect the simultaneous input over the two privileged sessions (i.e., the other individual's input over the privileged session from the administrator's desk and the administrator's direct input to the server while in the server room) and take appropriate action.

In some embodiments, there may be scenarios where a single administrator may be legitimately providing simultaneous input over multiple privileged sessions. For example, an administrator may use an automation technology to play input sequences into multiple privileged sessions to accomplish the same task on multiple servers. Due to the automation, it is likely that the input would be provided simultaneously in many cases (e.g., when the task is started on one server prior to being completed on another server). To address this possibility, a PAM system may be configured to determine whether the input data is being generated by automation technology as opposed to being directly input by a human. In some embodiments, this determination can be made by comparing the sequence of input that is provided into each of the concurrent privileged sessions. If the PAM system determines that the same sequences are being provided in each privileged session, the PAM system can assume that it is likely that automation technology is being used. To facilitate this type of determination, the PAM system can be configured to store the input data that is received over one privileged session so that it can be compared to the input data subsequently received over another privileged session.

The following provides a number of use scenarios where the present invention can be beneficial for enforcing a policy that requires that admin credentials or privileged sessions not be shared. First, if an administrator creates or receives a first privileged session, passes the first privileged session to another individual, and then creates or receives a second privileged session, the present invention can detect that input is being provided simultaneously over each privileged session and address the policy violation accordingly. This first example is likely when an administrator starts one task via the first privileged session and then asks another individual to complete the task while the administrator moves on to complete another task via the second privileged session.

Second, if an administrator uses the admin credentials to initiate a first privileged session to perform a first task, and also gives the admin credentials to another individual to separately initiate a second privileged session to perform a second task, the present invention can detect the occurrence of simultaneous input over both privileged sessions and again address the policy breach accordingly.

The present invention can also be beneficial in the following use scenarios to detect when admin credentials or a privileged session have been stolen or otherwise improperly accessed. First, after an administrator has received the admin credentials, another individual may improperly obtain the admin credentials (e.g., by stealing the admin credentials or by using the administrator's user credentials to separately request the admin credentials). The administrator and other individual may then independently initiate a privileged session using the admin credentials. The present invention can detect the occurrence of simultaneous input over each session and take appropriate action. For example, a PAM system may activate a camera on the device used by the other individual to capture an image of the individual.

Second, an administrator may open a first privileged session on one device, and then move to another device (or directly access the server) to open a second privileged session without first closing the first privileged session. Another individual may then access the first privileged session while the administrator is accessing the second privileged session. As with other examples, the present invention can detect the simultaneous input over both sessions and take appropriate action.

The present invention may be employed in many other use scenarios, and those provided should be construed as merely exemplary. In short, the present invention can be used to identify the simultaneous occurrence of input over multiple privileged sessions that are each associated with the same administrator in any PAM system architecture and as a result of any type of improper sharing or receipt of admin credentials or privileged sessions.

As mentioned above, the present invention can equally be employed when privileged sessions associated with the same administrator are opened with one or more servers. In other words, the present invention extends to monitoring multiple sessions associated with the same administrator regardless of which server or servers the sessions are with. Also, a PAM system as described above should be construed as encompassing implementations where a single PAM device or multiple PAM devices are employed to monitor the privileged sessions. For example, a cluster of PAM devices may be configured to monitor privileged sessions with different servers. An aggregation server could then be used to perform the functionality described above to determine whether more than one user was provided input simultaneously. In such cases, the term "PAM system" should be construed as including each PAM device and the aggregation server.

Figure 5:
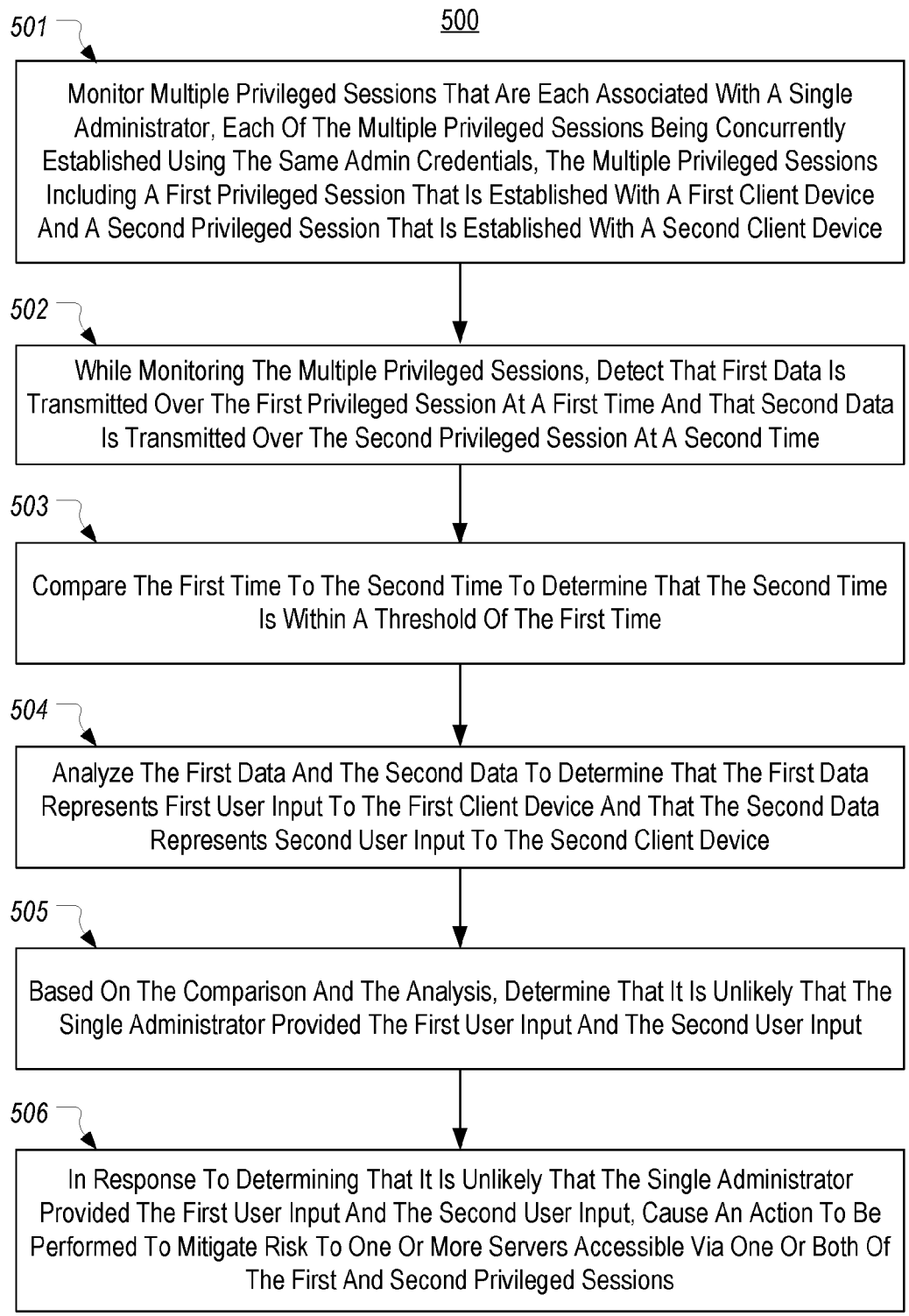
FIG. 5 illustrates a flowchart of an example method for detecting when multiple individuals are likely interacting with multiple privileged sessions that are associated with a single administrator.

FIG. 5 illustrates a flowchart of an example method 500 for detecting when multiple individuals are likely interacting with multiple privileged sessions that are associated with a single administrator. Although method 500 will be described primarily with reference to FIG. 3, it is to be understood that method 500 can be implemented by any PAM system capable of monitoring multiple privileged sessions regardless of how the privileged sessions are implemented (e.g., proxy-based, host-based, or hosted-session-based implementations).

Method 500 includes an act 501 of monitoring multiple privileged sessions that are each associated with a single administrator. Each of the multiple privileged sessions is concurrently established using the same admin credentials. The multiple privileged sessions include a first privileged session that is established with a first client device and a second privileged session that is established with a second client device. For example, PAM system 303 can monitor privileged sessions 310, 311 which are established using admin credentials checked out to administrator 350, or which are established by PAM system 303 in response to a request from administrator 350.

Method 500 includes an act 502 of, while monitoring the multiple privileged sessions, detecting that first data is transmitted over the first privileged session at a first time and that second data is transmitted over the second privileged session at a second time. For example, PAM system 303 can detect that a packet from privileged session 310 is transmitted at time 14:12:30.19 and a packet from privileged session 311 is transmitted at time 14:12:30.98.

Method 500 includes an act 503 of comparing the first time to the second time to determine that the second time is within a threshold of the first time. For example, PAM system 303 can determine that the time 14:12:30.98 is within one second of the time 14:12:30.19.

Method 500 includes an act 504 of analyzing the first data and the second data to determine that the first data represents first user input to the first client device and that the second data represents second user input to the second client device. For example, PAM system 303 can analyze the packet from privileged session 310 to determine that it contains keyboard input data and can analyze the packet from privileged session 311 to determine that it also contains keyboard input data.

Method 500 includes an act 505 of, based on the comparison and the analysis, determining that it is unlikely that the single administrator provided the first user input and the second user input. For example, PAM system 303 can determine that it is unlikely that administrator 350 was simultaneously typing on client device 302a and client device 302b.

Method 500 includes an act 506 of, in response to determining that it is unlikely that the single administrator provided the first user input and the second user input, causing an action to be performed to mitigate risk to one or more servers accessible via one or both of the first and second privileged sessions. For example, PAM system 303 can close, record, or watch one or both of privileged sessions 310, 311, can notify a security officer, can annotate one or both of privileged sessions 310, 311, or otherwise generate an alert identifying the likelihood that more than one individual was accessing privileged sessions 310, 311.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for monitoring activity of privileged sessions comprising:
   while a first privileged session is established using first admin credentials, detecting that a second privileged session is concurrently established using the first admin credentials;
   based on the first and second privileged sessions having both been established using the first admin credentials, monitoring packets that are transmitted over the first privileged session while also monitoring packets that are transmitted over the second privileged session;
   based on the monitoring, detecting that first input is transmitted over the first privileged session and that second input is transmitted over the second privileged session;
   determining that the first and second input occurred simultaneously; and
   taking an action to prevent the first or second privileged session from being used to cause harm.

2. The method of claim 1, further comprising:
   determining that the first and second input both represent user input.

3. The method of claim 1, wherein the user input comprises one or both of keyboard input or mouse input.

4. The method of claim 1,
   wherein the first admin credentials are checked out to a first administrator during the monitoring.

5. The method of claim 1, wherein the first and second privileged sessions are remote sessions.

6. The method of claim 1, wherein the first privileged session is established on a first server and the second privileged session is established on a second server.

7. The method of claim 1, wherein the first and second privileged sessions are established on the same server.

8. The method of claim 1, wherein the action comprises one or more of:
   terminating one or both of the first or second privileged sessions; or
   notifying an individual.

9. A method for monitoring activity of privileged sessions comprising:
   while a first privileged session is established using first admin credentials that are checked out to a first administrator, detecting that a second privileged session is concurrently established using second admin credentials that are also checked out to the first administrator;

based on the first and second privileged sessions having been established using the first and second admin credentials that are checked out to the first administrator, monitoring packets that are transmitted over the first privileged session while also monitoring packets that are transmitted over the second privileged session;

based on the monitoring, detecting that first input is transmitted over the first privileged session and that second input is transmitted over the second privileged session;

determining that the first and second input occurred simultaneously; and taking an action to prevent the first or second privileged session from being used to cause harm.

10. The method of claim 9, wherein detecting that first input is transmitted over the first privileged session comprises monitoring packets that are transmitted over the first privileged sessions and detecting that second input is transmitted over the second privileged session comprises monitoring packets that are transmitted over the second privileged session.

11. The method of claim 9, further comprising:
determining that the first and second input both represent user input.

12. The method of claim 9, wherein the user input comprises one or both of keyboard input or mouse input.

13. The method of claim 9, wherein the first privileged session is established on a first server and the second privileged session is established on a second server.

14. The method of claim 9, wherein the first admin credentials are different from the second admin credentials.

15. The method of claim 9, wherein the first and second admin credentials are the same.

16. The method of claim 9, wherein the action comprises one or more of:

terminating one or both of the first or second privileged sessions; or notifying an individual.

17. The method of claim 9, wherein determining that the first and second input occurred simultaneously comprises determining that the first input occurred within a threshold of the second input.

18. The method of claim 17, wherein the threshold is identified based on a type of the first input or a type of the second input.

19. One or more computer storage media storing computer executable instructions which when executed by one or more processors implements a method for monitoring activity of privileged sessions, the method comprising:

while a first privileged session is established using first admin credentials that are checked out to a first administrator, detecting that a second privileged session is concurrently established using second admin credentials that are also checked out to the first administrator;

based on the first and second privileged sessions having been established using the first and second admin credentials that are checked out to the first administrator, monitoring packets that are transmitted over the first privileged session while also monitoring packets that are transmitted over the second privileged session;

based on the monitoring, detecting that one or more first packets defining user input are transmitted over the first privileged session and that one or more second packets defining user input are transmitted over the second privileged session;

determining that the user input defined by the one or more first packets and the user input defined by the one or more second packets occurred simultaneously; and taking an action to prevent the first or second privileged session from being used to cause harm.

* * * * *